(12) United States Patent
Ogawa et al.

(10) Patent No.: US 8,664,962 B2
(45) Date of Patent: *Mar. 4, 2014

(54) WINDING METHOD AND WINDING STRUCTURE OF STATOR FOR ROTATION DETECTOR, AND ELECTRIC MOTOR COMPRISING ROTATION DETECTOR

(75) Inventors: Takashi Ogawa, Osaka (JP); Yuichi Yoshikawa, Osaka (JP); Yasuji Echizen, Osaka (JP); Masahiko Kobayashi, Hyogo (JP); Masaaki Nishiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/643,947

(22) PCT Filed: Jan. 10, 2012

(86) PCT No.: PCT/JP2012/000075
§ 371 (c)(1),
(2), (4) Date: Oct. 26, 2012

(87) PCT Pub. No.: WO2012/101961
PCT Pub. Date: Aug. 2, 2012

(65) Prior Publication Data
US 2013/0043864 A1 Feb. 21, 2013

(30) Foreign Application Priority Data
Jan. 27, 2011 (JP) ................................ 2011-014960

(51) Int. Cl.
*G01R 31/06* (2006.01)

(52) U.S. Cl.
USPC ...... 324/546; 324/545; 324/207.15; 310/112; 310/114; 310/266; 310/156.36; 310/156.37

(58) Field of Classification Search
USPC ................. 324/173–174, 200–263, 545–546; 73/488–520.01; 701/41–43; 702/94, 702/151; 310/112, 114, 266, 156.36, 310/156.37
See application file for complete search history.

(56) References Cited

U.S. PATENT DOCUMENTS

| 4,107,583 A * | 8/1978 | Houtman ...................... 318/781 |
| 2009/0134735 A1* | 5/2009 | Yoshikawa et al. ........... 310/198 |

(Continued)

FOREIGN PATENT DOCUMENTS

| JP | 08-098486 A | 4/1996 |
| JP | 2003-209942 A | 7/2003 |

(Continued)

OTHER PUBLICATIONS

International Search Report for International Application No. PCT/JP2012/000075, dated Feb. 7, 2012, 1 page.
Office Action in corresponding Chinese Application No. 201280003232.1, and partial translation thereof, dated Sep. 6, 2013, 11 pages.

Primary Examiner — Arleen M Vazquez
Assistant Examiner — Son Le
(74) Attorney, Agent, or Firm — Brinks Gilson & Lione

(57) ABSTRACT

The N1(s) turns of a first output winding is divided by a split ratio α into N1a(s) turns of a lower-layer first output winding and N1b(s) of an upper-layer first output winding. The lower-layer first output winding is continuously wound around all slots as the undermost layer. A second output winding is continuously wound around all slots over the lower-layer first output winding. An upper-layer first output winding is continuously wound around all slots over the second output winding. The split ratio α is adjusted only in the slots where the detection accuracy decreases. This equalize the contribution of the first output windings and the second output winding to the flux linkage, thereby achieving high angle detection accuracy.

7 Claims, 8 Drawing Sheets

(56) References Cited

U.S. PATENT DOCUMENTS

2009/0134739 A1* 5/2009 Akita .......................... 310/216
2013/0088127 A1* 4/2013 Ogawa et al. ............... 310/68 B

FOREIGN PATENT DOCUMENTS

| JP | 2006-125995 A | 5/2006 |
| WO | WO 2007/029678 A1 | 3/2007 |

* cited by examiner

US 8,664,962 B2

WINDING METHOD AND WINDING STRUCTURE OF STATOR FOR ROTATION DETECTOR, AND ELECTRIC MOTOR COMPRISING ROTATION DETECTOR

This application is a 371 application of PCT/JP2012/000075 having an international filing date of Jan. 10, 2012, which claims priority to JP2011-014960 filed Jan. 27, 2011, the entire contents of which are incorporated herein by reference.

TECHNICAL FIELD

The present invention relates to a winding method and winding structure of a stator for rotation detector, and an electric motor comprising the rotation detector.

BACKGROUND ART

A conventional winding method of a stator for rotation detector is disclosed in Patent Literature 1. FIG. 9 is a configuration of the winding method of a stator shown in Patent Literature 1. In this method, output winding 101 and output winding 102, which are different in phase from each other, are wound around slots defined by the adjacent magnetic poles. Output winding 101 is wound around every other slot. Output winding 102 is wound around all slots over output winding 101. Then, output winding 101 is wound over output winding 102 around the slots that do not have output winding 101 as the undermost layer. When the windings around the slots are viewed in cross section, the order of winding output windings 101 and 102 is alternated from one slot to the next. In FIG. 9, the conventional stator for rotation detector includes stator core 103.

According to this method, output windings 101 and 102 can be misaligned so as to reduce variation between output signal A from output winding 101 and output signal B from output winding 102, thereby having high detection accuracy of a rotation angle.

There are, however, following problems with the aforementioned winding method of Patent Literature 1.

In the rotation detector of this type, in principle, the output signals have different amplitudes depending on their rotation angles. Therefore, the number of turns of the output windings around the slots needs to be varied sinusoidally. This causes the contribution to the flux linkage between these output windings to be different from slot to slot. As a result, the winding method of Patent Literature 1 has limitations in reducing the imbalance of contribution to the flux linkage between these output windings.

More specifically, assume that output winding 101 has the same number of turns in all slots, and output winding 102 also has the same number of turns in all slots. Then, the contribution to the flux linkage can be equalized between output windings 101 and 102 in all slots by alternating the order of winding them from one slot to the next, thereby reducing variation between the output signals. In the rotation detector of the present invention, however, the number of turns of each output winding around the slots needs to be varied sinusoidally as described above. Thus, since the number of turns of each output winding differs from slot to slot, it is difficult to equalize the contribution to the flux linkage between output windings 101 and 102 only by alternating the order of winding them from one slot to the next.

Patent Literature 1: Japanese Patent No. 3681167

SUMMARY OF THE INVENTION

In the winding method of a stator for rotation detector according to the present invention, the stator includes a stator core that is ring shaped and has a plurality of magnetic poles, which are arranged at regular intervals in the circumferential direction and project either to the inner diameter side or the outer diameter side of the stator core. The stator core has a first output winding and a second output winding, which are different in phase by 90 degrees from each other and are wound around slots defined by the adjacent magnetic poles. The first output winding has N1(s) turns, and the second output winding has N2(s) turns, each of the N1(s) turns and the N2(s) turns being varied sinusoidally through the slots. The N1(s) turns of the first output winding is divided by a split ratio α into N1a(s) turns and N1b(s) turns. A lower-layer first output winding having the N1a(s) turns is continuously wound, as the undermost layer, around all slots. The second output winding is continuously wound around all slots over the lower-layer first output winding. An upper-layer first output winding having the N1b(s) turns is continuously wound around all slots over the second output winding. The split ratio α is adjusted only in one or more given slots.

According to the present invention, the number of turns of the first output winding is divided by a given split ratio α, and the split ratio is adjusted in given slots. As a result, a balance is struck in the contribution to the flux linkage between the first output winding and the second output winding, thereby reducing variation between output signals A and B. This results in reducing variation between angular signals generated from output signals A and B, thereby achieving high angle detection accuracy.

DETAILED DESCRIPTION OF THE PREFERRED EMBODIMENTS

A method of winding a wire on a stator for rotation detector according to the present invention will now be described as preferred embodiments.

First Exemplary Embodiment

Figure 1:
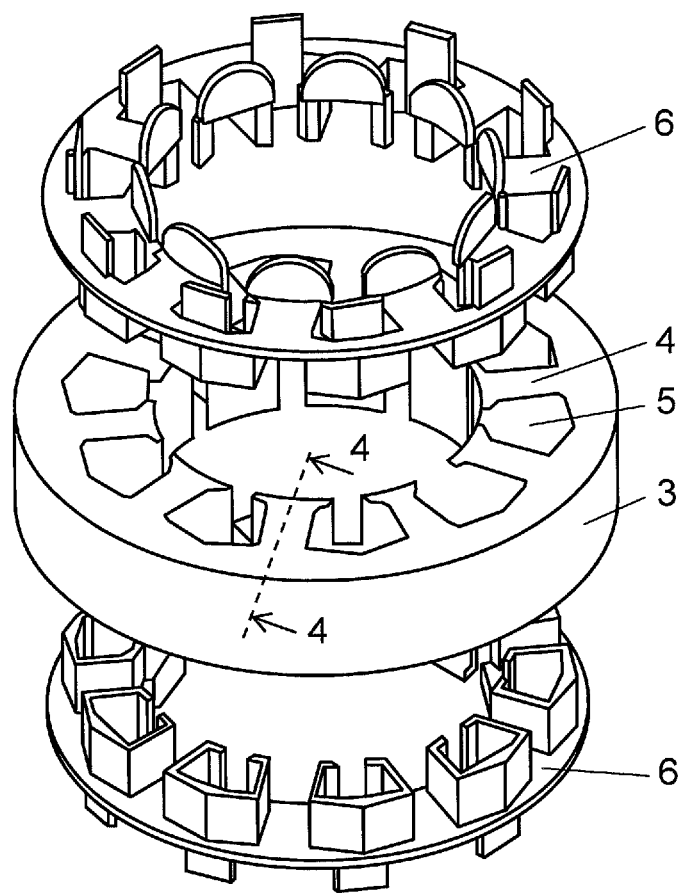
FIG. 1 shows a stator for rotation detector according to a first embodiment of the present invention.
Figure 2:
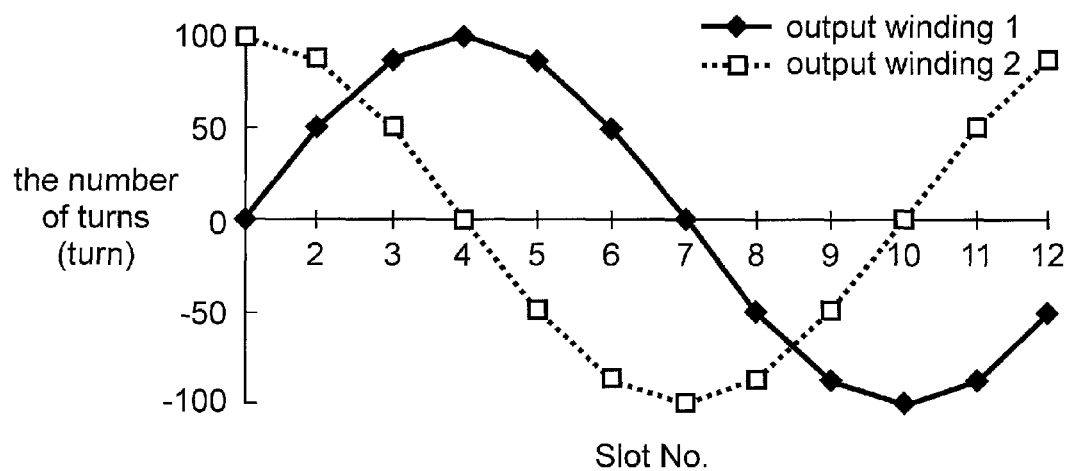
FIG. 2 shows the distributions of the numbers of turns of output windings in the stator for rotation detector according to the first embodiment.

FIG. 1 shows a stator for rotation detector according to a first embodiment of the present invention. As shown in FIG. 1, the stator for rotation detector according to the first embodiment includes stator core 3, windings (not shown), and insulators 6. Stator core 3 is ring shaped, and has magnetic poles 4, which are arranged at regular intervals in the circumferential direction and project either to the inner diameter side or to the outer diameter side of stator core 3. The windings are wound around slots 5 defined by adjacent magnetic poles 4. Insulators 6 are arranged in such a manner as to cover stator core 3 from both sides in the axial direction, thereby electrically insulating between stator core 3 and the windings. The windings, which are not illustrated in FIG. 1, consist of output winding 1 (first output winding) and output winding 2 (second output winding). Output winding 1 generates a sinusoidal output signal A according to the rotation angle. Output winding 2 generates a sinusoidal output signal B, which is different in phase by 90 degrees from the signal A. The number of turns of each of output windings 1 and 2 around the slots is varied sinusoidally, so that output windings 1 and 2 generate the output signals A and B, respectively. FIG. 2 shows the distributions of the numbers of turns of the output windings. These distributions are merely one example; output windings 1 and 2 have only to be different in phase by 90 degrees from each other.

Figure 3:
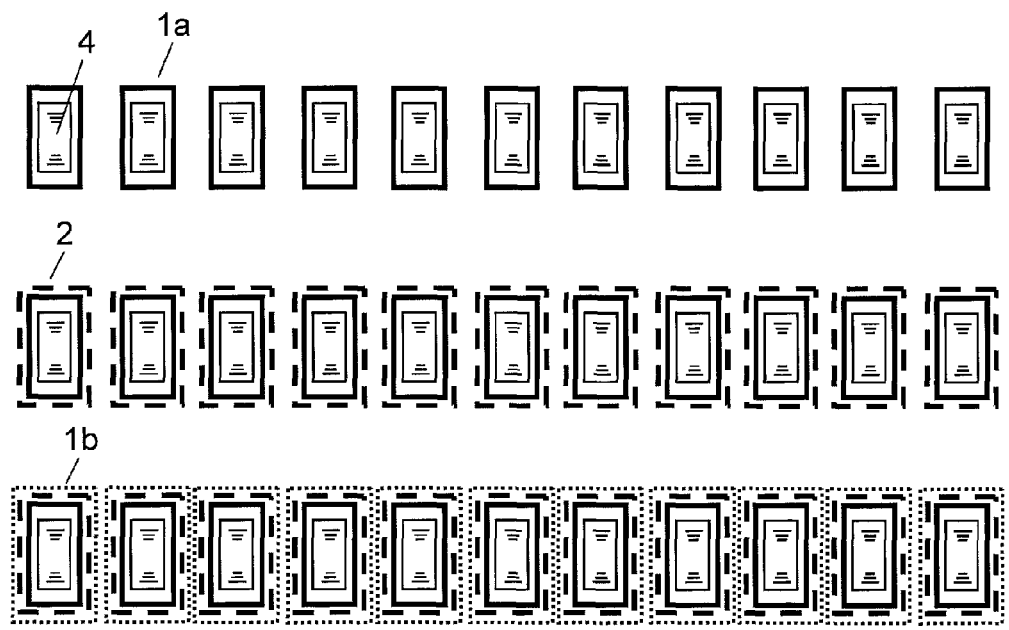
FIG. 3 is a configuration of a winding method of the stator for rotation detector according to the first embodiment.

FIG. 3 is a configuration of the winding method of the stator for rotation detector according to the first embodiment. As shown in FIG. 3, output winding 1 has N1(s) turns, which is varied sinusoidally through the slots. The N1(s) turns is divided by a split ratio α into N1a(s) turns of output winding 1a (lower-layer first output winding) and N1b(s) turns of output winding 1b (an upper-layer first output winding). Output winding 1a having the N1a(s) turns is continuously wound, as the undermost layer, around all slots. Output winding 2 is continuously wound around all slots over output winding 1a. Output winding 1b having the N1b(s) turns is continuously wound around all slots over output winding 2. The end of output winding 1a is electrically connected to the start of output winding 1b.

Figure 4:
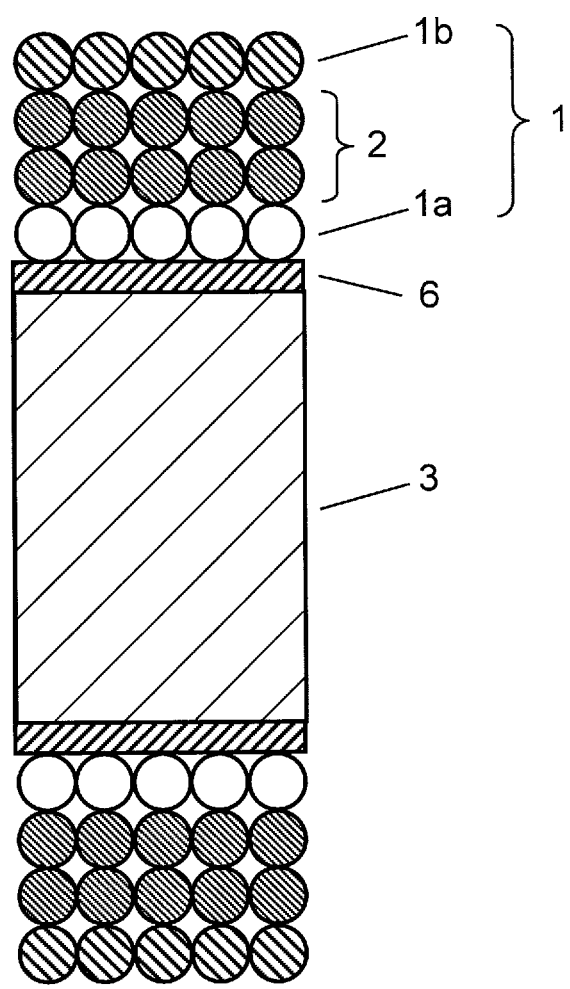
FIG. 4 is a cross sectional view of the stator for rotation detector taken along line 4-4 of FIG. 1.

FIG. 4 is a cross sectional view of the stator for rotation detector taken along line 4-4 of FIG. 1. As shown in FIG. 4, in the winding method of stator for rotation detector according to the first embodiment, output winding 1b is disposed over output winding 2, and output winding 1a is disposed under output winding 2 in stator core 3. Thus, output windings 1a and 1b sandwich output winding 2 therebetween. Between stator core 3 and output winding 1a, there are disposed insulators 6. The split ratio α is adjusted in the slots where the detection accuracy decreases, so that the ratio of the N1a(s) turns to the N1b(s) turns can be different from slot to slot.

Figure 5:
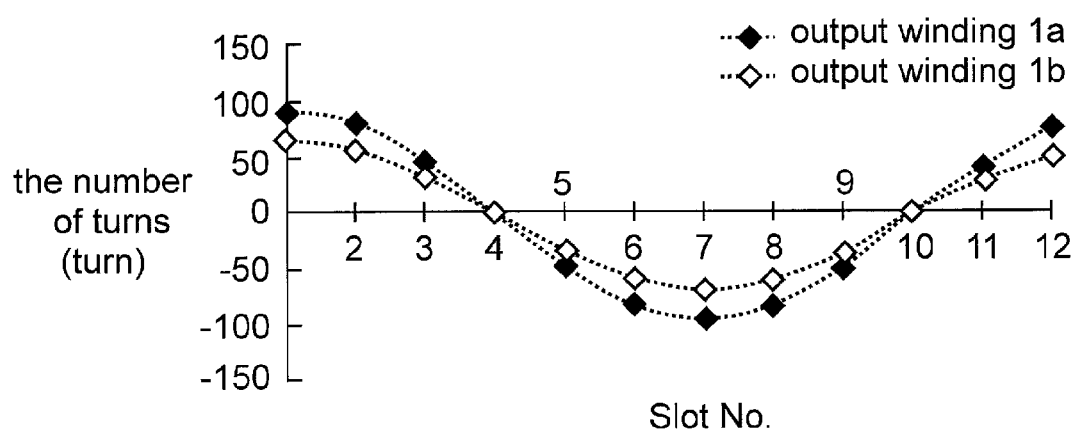
FIG. 5 shows the distributions of the numbers of turns of output winding 1 in the stator according to the first embodiment when the split ratio α of windings 1 is varied sinusoidally.

FIG. 5 shows the distributions of the numbers of turns of output winding 1 when the split ratio α is varied sinusoidally. Varying the split ratio α sinusoidally as shown in FIG. 5 allows output winding 1 to be divided into output winding 1a and output winding 1b equally in all slots.

The aforementioned winding method and winding structure of the stator for rotation detector according to the present invention provide the following advantages. Adjusting the split ratio α results in adjusting the contribution to the flux linkage between output windings 1 and 2, and the impedance of these windings. Thus, the split ratio α can be adjusted individually in the slots where the detection accuracy decreases. This can reduce variation between output signals A and B, thereby achieving high detection accuracy of the rotation angle.

Figure 6:
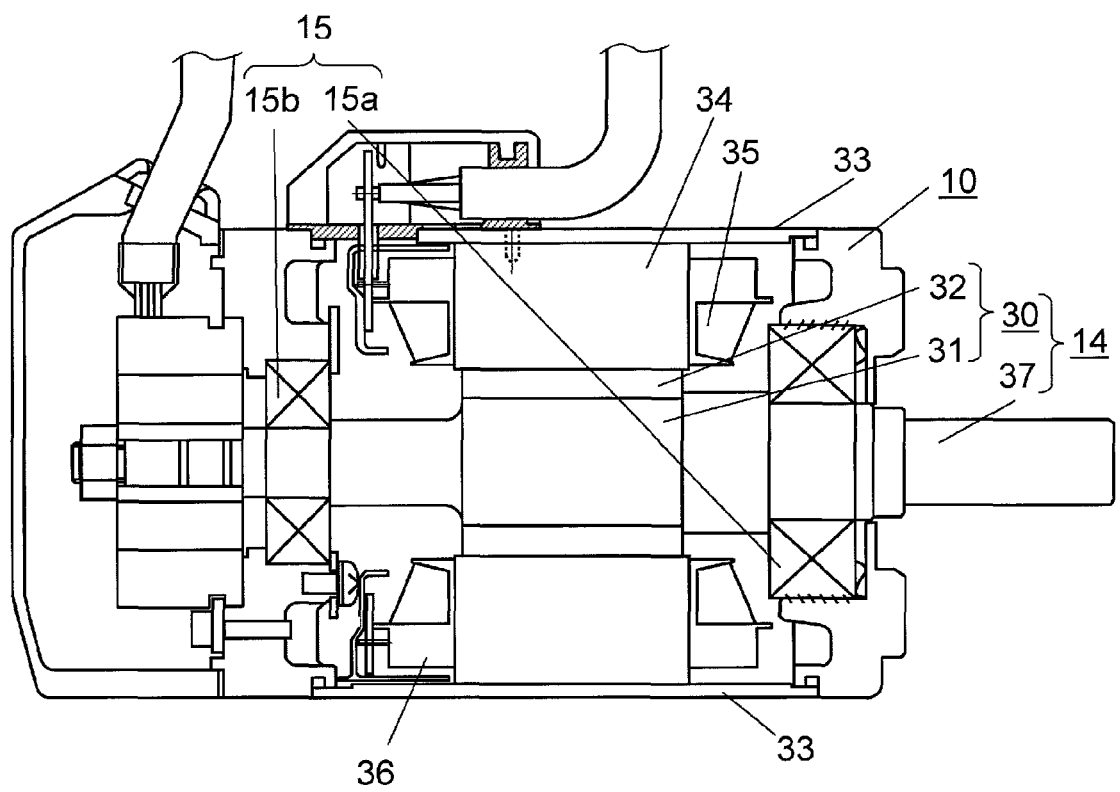
FIG. 6 is a cross sectional view of an electric motor according to the first embodiment.

FIG. 6 is a cross sectional view of an electric motor according to the first embodiment. The electric motor of the present embodiment includes the stator for rotation detector shown in FIG. 1. As an example of the electric motor, the present embodiment will describe a brushless motor of inner rotor type, in which a rotor is rotatably disposed on the inner periphery side of the stator.

In FIG. 6, the electric motor includes stator (stator for rotation detector) 10 having stator core 34. Around stator core 34, stator winding 35 is wound as an output winding via insulators 36, which are resins to insulate stator core 34. Stator core 34 is molded with insulating resin 33 as a molding material and with other fixing members. In the present embodiment, these components are integrally molded into stator 10 having a substantially cylindrical contour.

The electric motor further includes rotor 14 inserted into the inside of stator 10 via a gap. Rotor 14 includes disk-shaped rotation body 30 and shaft 37. Rotation body 30 includes rotor core 31. Shaft 37 penetrates through the center of rotation body 30 so as to fasten rotation body 30. Rotor core 31 includes permanent magnets, which are arranged in the circumferential direction and are opposite to the inner periphery side of stator 10. In the structure of FIG. 6, rotor core 31 and ferrite resin magnets 32 as the permanent magnets are integrally molded. The inner periphery side of stator 10 and the outer periphery side of rotation body 30 are opposite to each other.

Shaft 37 of rotor 14 is supported by two bearings 15, which are cylindrical and includes iron balls. The inner rings of bearings 15 are fixed to shaft 37. In FIG. 6, shaft 37 is supported by bearing 15a on the output side on which shaft 37 projects from the body of the brushless motor, and is supported by bearing 15b on the other side. The outer ring of bearing 15a on the output side is fixed with conductive metal bracket 17. The outer ring of bearing 15b on the side opposite to the output side is fixed with insulating resin 33, which is molded with the other components. Thus, shaft 37 is supported by two bearings 15 so as to rotate rotor 14.

Second Exemplary Embodiment

Figure 7:
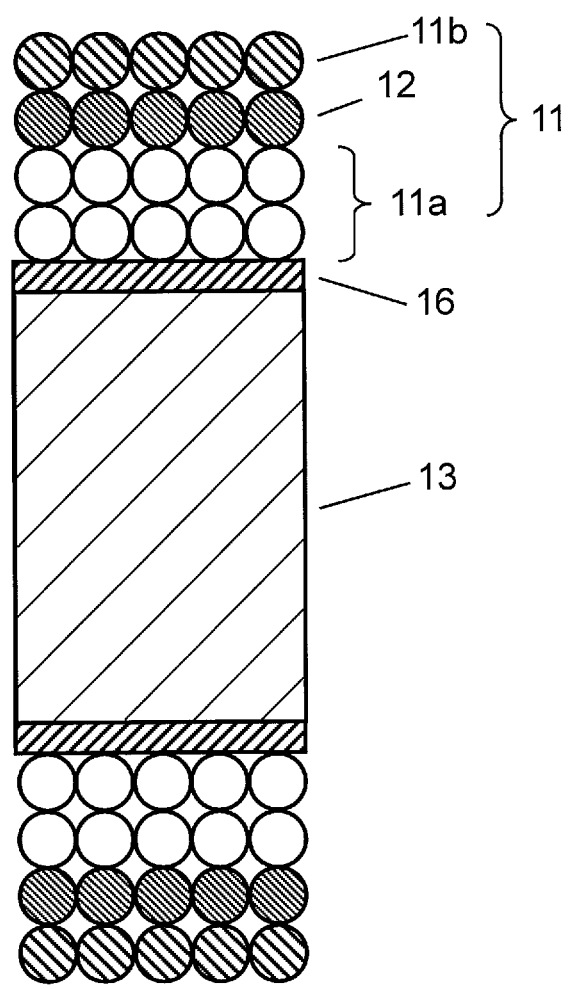
FIG. 7 is a cross sectional view of output windings in the stator for rotation detector according to a second embodiment of the present invention.

FIG. 7 is a cross sectional view of output windings in the stator for rotation detector according to a second embodiment of the present invention. As shown in FIG. 7, in the winding method of the stator for rotation detector according to the second embodiment, output winding 11 (first output winding) has N11(s) turns, and output winding 12 (second output winding) has N12(s) turns, each of the N11(s) turns and the N12(s) turns being varied sinusoidally through the slots. The N11(s) turns is divided by the split ratio α into N11a(s) turns of output winding 11a (lower-layer first output winding) and N11b(s) turns of output winding 11b (upper-layer first output winding). The N11a(s) turns is larger than the N11b(s) turns. Output winding 11a having the N11a(s) turns is continuously wound, as the undermost layer, around all slots of stator core 13 via insulators 16. Output winding 12 is continuously wound around all slots over output winding 11a. Output winding 11b having the N11b(s) turns is continuously wound around all slots over output winding 12. The end of output winding 11a is electrically connected to the start of output winding 11b.

When output winding 12 has a larger contribution to the flux linkage than output winding 11, output winding 11 is wound a large number of turns at the undermost layer. This reduces the contribution of output winding 11a to the flux linkage, thereby equalizing the contribution between output windings 11 and 12. This results in reducing variation between output signals A and B, thereby achieving high detection accuracy of the rotation angle.

Third Exemplary Embodiment

Figure 8:
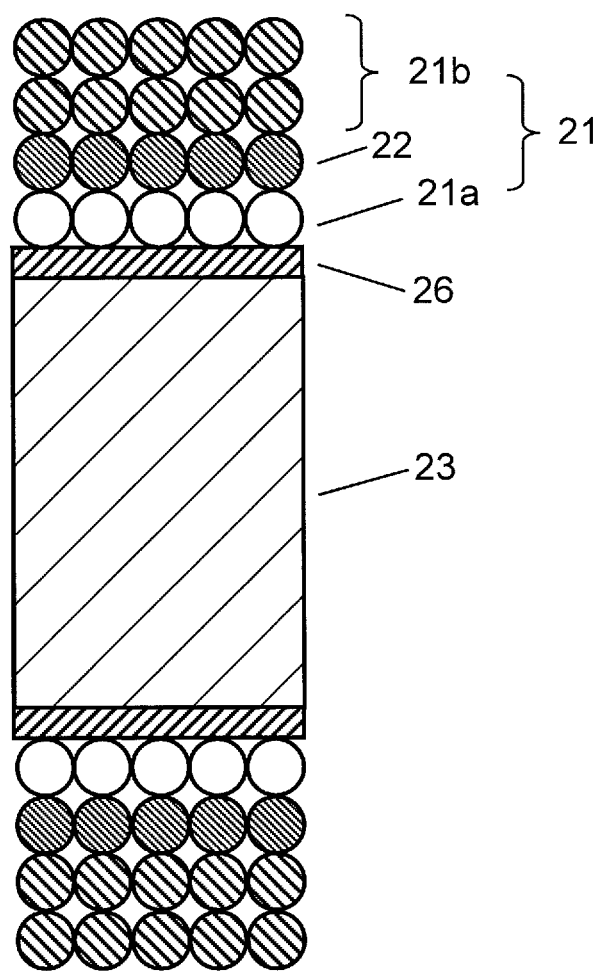
FIG. 8 is a cross sectional view of output windings in the stator for rotation detector according to a third embodiment of the present invention.
Figure 9:
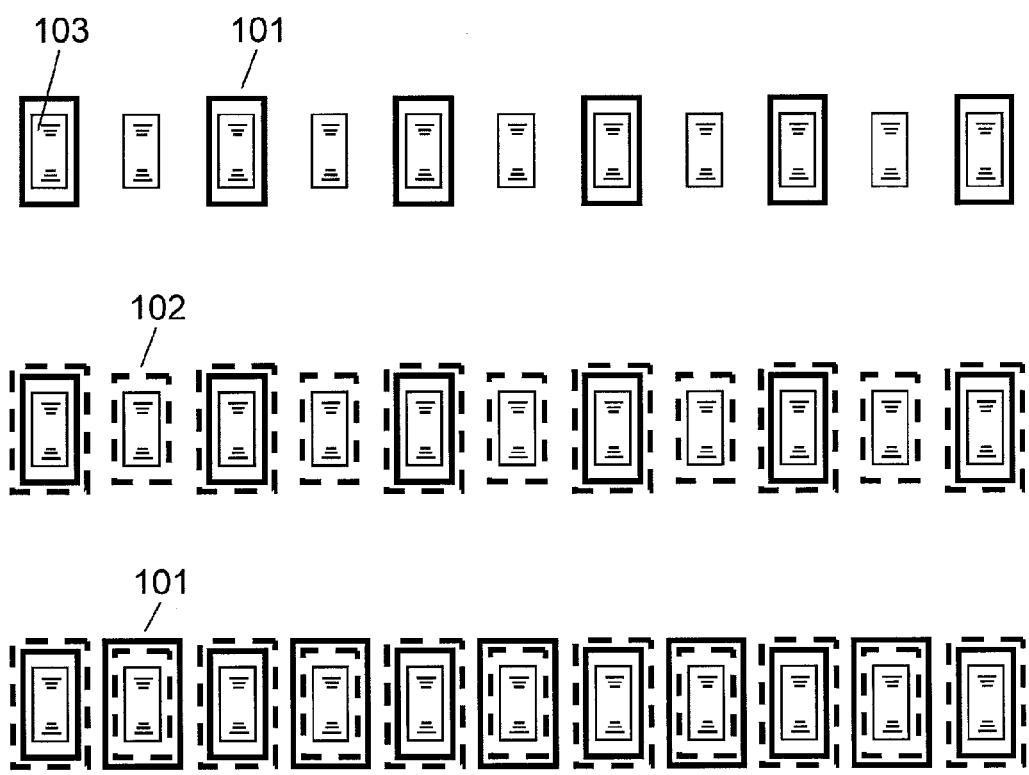
FIG. 9 is a configuration of a winding method of a conventional stator for rotation detector.

FIG. 8 is a cross sectional view of the output windings in the stator for rotation detector according to a third embodiment of the present invention. As shown in FIG. 8, in the winding method of the stator for rotation detector according to the third embodiment, output winding 21 (first output winding) has N21(s) turns, and output winding 22 (second output winding) has N22(s) turns, each of the N21(s) turns and the N22(s) turns being varied sinusoidally through the slots. The N21(s) turns is divided by the split ratio α into N21a(s) turns of output winding 21a (lower-layer first output winding) and N21b(s) turns of output winding 21b (upper-layer first output winding). The N21a(s) turns is smaller than the N21b(s) turns. Output winding 21a having the N21a(s) turns is continuously wound, as the undermost layer, around all slots of stator core 23 via insulators 26. Output winding 22 is continuously wound around all slots over output winding 21a. Output winding 21b having the N21b(s) turns is continuously wound around all slots over output winding 22. The end of output winding 21a is electrically connected to the start of output winding 21b.

When output winding 21 has a larger contribution to the flux the linkage than output winding 22, output winding 21 is wound a large number of turns at the third layer. This increases the contribution of output winding 21a to the flux linkage, thereby equalizing the contribution between output windings 21 and 22. This results in reducing variation between output signals A and B, thereby achieving high detection accuracy of the rotation angle.

The first to third embodiments are merely exemplary; the present invention is not limited to these embodiments and can be properly modified.

For example, the stator in the first to third embodiments is inner rotor type having stator teeth (magnetic poles) on the inner circumference surface side of the stator core. Alternatively, the stator may be outer rotor type having the stator teeth on the outer circumference surface side of the stator core.

The number of the stator teeth in the stator core in the first to third embodiments is not limited to 12; it may be more or less than 12.

In the stator in the first to third embodiments, only output windings are wound; alternatively, excitation windings for generating excitation signals may be wound under the output windings as in variable reluctance resolvers.

As described hereinbefore, in the winding method of the stator for rotation detector according to the present invention, the stator includes stator core 3 that is ring shaped and has magnetic poles 4, which are arranged at regular intervals in the circumferential direction and project either to the inner diameter side or to the outer diameter side of stator core 3. Stator core 3 has output winding 1 and output winding 2, which are different in phase by 90 degrees from each other and are wound around slots 5 defined by adjacent magnetic poles 4. Output winding 1 has N1(s) turns, and output winding 2 has N2(s) turns, each of the N1(s) turns and the N2(s) turns being varied sinusoidally through the slots. The N1(s) turns of output winding 1 is divided by a split ratio α into N1a(s) turns and N1b(s) turns. Output winding 1a having the N1a(s) turns is continuously wound, as the undermost layer, around all slots. Output winding 2 is continuously wound around all slots over output winding 1a. Output winding 1b having the N1b(s) turns is continuously wound around all slots over output winding 2. The split ratio α is adjusted only in one or more given slots.

Thus, adjusting the split ratio α results in adjusting the distance between each of output windings 1, 2 and the magnetic flux flowing through the magnetic poles, thereby adjusting the contribution to the flux linkage between output windings 1 and 2. As a result, the contribution to the flux linkage can be equalized between output windings 1 and 2 in all slots, thereby reducing variation between the output signal A from output winding 1 and the output signal B from output winding 2. According to the detection principle, the detection accuracy varies depending on the machining accuracy and assembly accuracy. This allows the contribution to the flux linkage between output windings 1 and 2 to be minutely adjusted by adjusting the split ratio α only in the slots corresponding to the angle at which the detection accuracy decreases. This results in reducing variation between output signals A and B, thereby achieving high angle detection accuracy.

Furthermore, it is preferable that the split ratio α be varied sinusoidally through slots 5. It is also preferable that the distribution of the N1(s) turns of output winding 1 through slots 5 be equal to the change in the split ratio α through the slots.

The N1(s) turns of output winding 1 is varied sinusoidally through slots 5. Therefore, if the N1(s) turns is divided by a constant value in all slots 5, the positional relationship between magnetic pole 4 and each of output windings 1a, 1b differs from slot to slot. This causes the contribution to the flux linkage between output windings 1a and 1b to be different from slot to slot, thereby having higher variation between output signals A and B. To overcome this problem, the distribution of the N1(s) turns of output winding 1 through slots 5 is made equal to the change in the split ratio α through slots 5. As a result, output windings 1a and 1b can be in the same proportion in all slots 5. This allows the contribution to the flux linkage between output windings 1 and 2 to be minutely adjusted so as to reduce variation between output signals A and B, thereby achieving high angle detection accuracy.

Furthermore, it is preferable that output winding 1 be wound in such a manner that the N1a(s) turns is larger than the N1b(s) turns.

When output winding 1 has a smaller contribution to the flux linkage than output winding 2, output winding 1 is wound in such a manner that the N1a(s) turns can be larger than the N1b(s) turns. As a result, output winding 1 can be wound a large number of turns in a position near magnetic poles 4. This increases the contribution of output winding 1 to the flux linkage, thereby being balanced with the contribution of output winding 2. This results in reducing variation between output signals A and B, thereby achieving high angle detection accuracy.

It is preferable that output winding 1 be wound in such a manner that the N1a(s) turns is smaller than the N1b(s) turns.

When output winding 1 has a larger contribution to the flux linkage than output winding 2, output winding 1 is wound in such a manner that the N1a(s) turns can be smaller than the N1b(s) turns. As a result, output winding 1 can be wound a larger number of turns in a position distant from magnetic poles 4. This reduces the contribution of output winding 1 to the flux linkage, thereby being balanced with the contribution of output winding 2. This results in reducing variation between output signals A and B, thereby achieving high angle detection accuracy.

In the winding structure of the stator for rotation detector according to the present invention, the stator includes stator core 3 that is ring shaped and has a plurality of magnetic poles, which are arranged at regular intervals in the circumferential direction and project either to the inner diameter side or the outer diameter side of stator core 3. Stator core 3 has output windings 1 and 2, which are different in phase by 90 degrees from each other and are wound around slots 5 defined by adjacent magnetic poles 4. Output winding 1 has N1(s) turns, and output winding 2 has N2(s) turns, each of the N1(s) turns and the N2(s) turns being varied sinusoidally through slots 5. The N1(s) turns of output winding 1 is divided by a split ratio α into N1a(s) and N1b(s). The winding structure includes output winding 1a, output winding 2, and output winding 1b. Output winding 1a having the N1a(s) turns is continuously wound, as the undermost layer, around all slots. Output winding 2 is continuously wound around all slots over output winding 1a. Output winding 1b having the N1b(s) turns is continuously wound around all slots over output winding 2. The split ratio α is adjusted only in one or more given slots.

INDUSTRIAL APPLICABILITY

The present invention provides a stator for rotation detector which has output signals with low variation. The stator can be mounted on various electrical devices such as resolvers for detecting the rotation angle of the shaft of an electric motor.

The invention claimed is:

1. A winding method of a stator for a rotation detector, the stator including a stator core that is ring shaped and has a plurality of magnetic poles, the magnetic poles being arranged at regular intervals in a circumferential direction and projecting either to an inner diameter side or an outer diameter side of the stator core, the stator core having a first output winding and a second output winding, which are different in phase by 90 degrees from each other and are wound around slots defined by the adjacent magnetic poles, wherein
the first output winding has N1(s) turns, and the second output winding has N2(s) turns, each of the N1(s) turns and the N2(s) turns being varied sinusoidally through the slots;
the N1(s) turns of the first output winding is divided by a split ratio α into N1a(s) turns and N1b(s) turns;
a lower-layer first output winding having the N1a(s) turns is continuously wound, as an undermost layer, around all slots;
the second output winding is continuously wound around all slots over the lower-layer first output winding;
an upper-layer first output winding having the N1b(s) turns is continuously wound around all slots over the second output winding; and
the split ratio α is adjusted only in one or more given slots.

2. The winding method of the stator for rotation detector of claim 1, wherein the split ratio α is varied sinusoidally through all slots.

3. The winding method of the stator for rotation detector of claim 2, wherein a slot where the N1(s) turns is the largest is identical to a slot having a largest split ratio α.

4. The winding method of the stator for rotation detector of claim 1, wherein the first output winding is divided by the split ratio α in such a manner that the N1a(s) turns is larger than the N1b(s) turns.

5. The winding method of the stator for rotation detector of claim 1, wherein the first output winding is divided by the split ratio α in such a manner that the N1a(s) turns is smaller than the N1b(s) turns.

6. A winding structure of a stator for rotation detector, the stator including a stator core that is ring shaped and has a plurality of magnetic poles, the magnetic poles being arranged at regular intervals in a circumferential direction and projecting either to an inner diameter side or an outer diameter side of the stator core, the stator core having a first output winding and a second output winding, which are different in phase by 90 degrees from each other and are wound around slots defined by the adjacent magnetic poles, wherein
the first output winding has N1(s) turns, and the second output winding has N2(s) turns, each of the N1(s) turns and the N2(s) turns being varied sinusoidally through the slots; and
the N1(s) turns of the first output winding is divided by a split ratio α into N1a(s) turns and N1b(s) turns, wherein the winding structure comprises:
a lower-layer first output winding, which is continuously wound N1a(s) turns, as an undermost layer, around all slots;
the second output winding, which is continuously wound around all slots over the lower-layer first output winding; and
an upper-layer first output winding, which is continuously wound N1b(s) turns around all slots over the second output winding, and
the split ratio α is adjusted only in one or more given slots.

7. A electric motor comprising a stator having the winding structure defined in claim 6 for rotation detector.

* * * * *